United States Patent [19]

Christo

[11] 4,043,359

[45] Aug. 23, 1977

[54] WATER FAUCET

[75] Inventor: Christ Christo, Farmington Hills, Mich.

[73] Assignee: Masco Corporation of Indiana, Greensburg, Ind.

[21] Appl. No.: 683,264

[22] Filed: May 5, 1976

[51] Int. Cl.² .................................. F16K 11/087
[52] U.S. Cl. ......................... 137/625.41; 137/625.4
[58] Field of Search .................... 137/625.4, 625.41

[56] References Cited

U.S. PATENT DOCUMENTS

| | | | |
|---|---|---|---|
| 2,985,566 | 5/1961 | Tsien et al. | 251/324 X |
| 3,056,418 | 10/1962 | Adams et al. | 137/625.41 X |
| 3,683,965 | 8/1972 | McClure et al. | 251/368 X |
| 3,747,638 | 7/1973 | Manoogian et al. | 137/625.4 |
| 3,823,742 | 7/1974 | Corpon | 137/625.41 X |

Primary Examiner—Arnold Rosenthal
Attorney, Agent, or Firm—E. Dennis O'Connor

[57] ABSTRACT

A water faucet of the type having an arcuate valve member movable between positions interconnecting a source of water and a faucet discharge and a position isolating the water source of the faucet discharge. The valve member is positioned in a valve body that includes stop means capable of bearing against the valve member to limit valve member movement between useful positions. The valve member is formed from plastic material that easily may be molded into a desired shape and includes a recess that partially receives the stop member. The periphery of the recess is lined with material having much greater hardness and resistance to wear than the plastic material of the valve member itself. The valve is molded into two mating parts with a portion of the recess included in each part. The relatively hard material is in the form of an insert that is mounted in grooves in each of the parts of the valve member and has an aperture into which extends the stop member.

5 Claims, 5 Drawing Figures

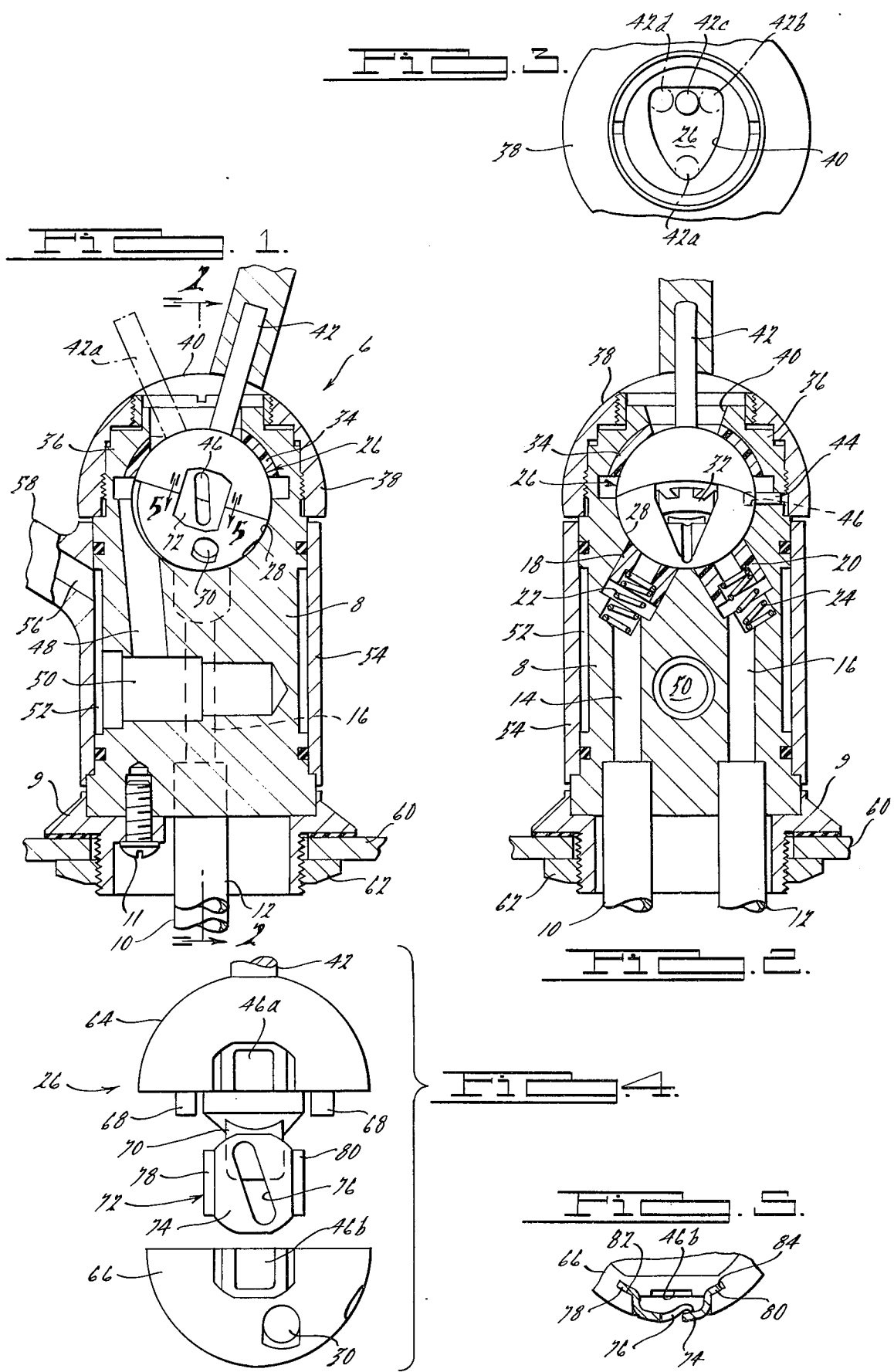

WATER FAUCET

BACKGROUND OF THE INVENTION

The advantages of water faucet valves having arcuate valve members with a spherical profile are well known in the art. Examples of such valves are disclosed in U. S. Pat. Nos. 3,056,418, issued Oct. 2, 1962; 3,417,783, issued Dec. 24, 1968 and 3,906,999, issued Sept. 23, 1975. Certain of such valves have achieved great commercial success due to their simplicity of design and ease of manufacture coupled with reliability of operation since such faucets do not utilize compression washers that have a tendency to wear relatively quickly and allow leakage. The arcuate valve member surfaces allow co-operation with mating, concave valve seats with a seal between the valve member and seat being provided by spring-loaded seals that utilize not only spring force but also the pressure of incoming water for sealing purposes.

Most commonly, arcuate valve members have been formed from brass. The forming operation first requires the formation of the desired arcuate profile, most commonly spherical, and then subsequent machining operations to provide either water passages through the valve or about the periphery of the valve. As readily may be appreciated, the relatively high price of brass and the necessity for such machining has constituted a substantial portion of the cost of manufacture of such faucets.

Various proposals have been considered in the past to mold arcuate valve members from synthetic plastic material, but such proposals have not proven wholly satisfactory because of the difficulty in molding the desired valve shapes and the inability of a moldable synthetic material available to wear well over the extended periods and high frequency of use to which commercial water faucets are subjected.

It is, therefore, an object of this invention to provide a water faucet of the arcuate valve member type wherein the valve member is a molded plastic element having a design that easily may be molded utilizing conventional techniques. A further object of the invention is to provide a water faucet having an arcuate, molded plastic valve member in which a provision is made for greater resistance to wear, especially against the necessary stops included in faucet designs to limit valve member movement to useful positions. A still further object of this invention is the provision of a water faucet having a molded plastic, wear resistant spherical valve member having overall simplicity of design, ease and low cost of manufacture and reliability of operation.

SUMMARY OF THE INVENTION

A water faucet constructed in accordance with this invention includes a valve body having an inlet duct connectable to a source of water and outlet duct. Valve means within the body selectively are movable to interconnect the inlet and outlet ducts or to isolate the inlet and outlet ducts. A manually operable handle extends from the valve body and is connected to the valve means for unitary movement with the latter. Stationary stop means are connected to the valve body for limiting the range of movement of the valve means to useful positions. The valve means comprises an arcuate member formed from plastic material having a peripheral recess formed therein. The stop means protrudes from the valve member and is received in the recess to guide and limit movement of the valve means. An insert member having an aperture extending therethrough is mounted in the recess such that the stop means extends through the aperture and into the recess. The insert is formed from a material having greater resistance to wear than the plastic material of the valve means, thus preventing contact between the stop means and the plastic material.

The valve means is a composite of two interlocking parts that meet at mating surfaces. The recess is formed so that portions of it extends into each of these mating parts. Grooves proximate to the recess portions are formed in each of the mating parts with the insert mounted in the valve by being partially received in grooves of each of the mating parts.

DESCRIPTION OF THE DRAWING

FIG. 1 is a side elevation view, with parts broken away and parts in section, of a water faucet constructed in accordance with this invention;

FIG. 2 is a sectional view taken along the line 2—2 of FIG. 1;

FIG. 3 is a top view, with parts broken away, of the faucet of FIGS. 1 and 2;

FIG. 4 is an exploded view of the elements of the valve member of the faucet of FIGS. 1 and 2; and FIG. 5 is a partial sectional view taken along the line 5—5 of FIG. 1.

DETAILED DESCRIPTION OF THE INVENTION

Referring now in detail to the drawing, the numeral 6 denotes generally a faucet contructed in accordance with this invention. Faucet 6 is a single handle mixing valve for hot and cold water similar in operation to that disclosed in U. S. Pat. No. 3,056,418. Thus, the description of the operation of faucet 6 will be in general terms only as the operation of such a valve is well known in the art. The illustration is exemplary only as the invention herein disclosed also is applicable to a valve having an arcuate valve member used to control hot or cold water only such as is disclosed in U. S. Pat. No. 3,906,999.

Faucet 6 includes a valve body 8 secured to a base 9 by means of a fastener 11. A pair of water inlet lines 10 and 12 are connected to sources of hot and cold water and communicate with water inlet passages 14 and 16, respectively, formed in valve body 8. Positioned in enlarged terminal ends of passages 14 and 16 are elastomeric seals 18 and 20 that are urged by the forces of compression springs 22 and 24, respectively, as well as the forces generated by the pressure of water in passages 14 and 16, into engagement with a spherical composite valve member 26. This valve member is positioned against a concave valve seat 28 having a partial spherical profile.

Illustrated valve member 26 has formed therein a pair of water inlet passages 30 (only one shown) leading to a central chamber where the hot and cold water mixes and then exits valve member 26 via triangular outlet opening 32. Valve member 26 is held in position against valve seat 28 by a sealing gasket 34 that, in turn, is held in position by a spacer member 36. The valve assembly is held together by a cap member 38 threadably engaged with valve body 8.

A generally triangular opening 40 (FIG. 3) is formed in the top of spacer 36. A valve handle 42 is secured to composite valve member 26 for unitary movement therewith and extends through opening 40 to outside the faucet 6. As is well known in the art and fully described in U. S. Pat. No. 3,056,418, operating handle 42 is movable among a plurality of positions comprising a triangular locus of points. Certain of these handle positions are shown in phantom in FIG. 3. Position 42a is the off position wherein the water inlet passages 14 and 16 are blocked by the structure of valve member 26. Positions 42b and 42d allow flow through the valve member of only hot or cold water, respectively. Position 42c allows flow through the valve member of both hot and cold water.

Twisting of the valve handle 42 about its own axis, and possible misorientation and eccentricity of the passages in the valve relative to the water inlet passages 14 and 16, is prevented by means of a stop member comprising pin 44 affixed to the inner face of the valve seat 28. As will be described in greater detail below, pin 44 is received in recess 46 formed in valve member 26 in order to limit valve member movement to useful positions.

Water exiting valve member 26 via discharge opening 32 flows down a discharge passage 48 formed in valve body 8 to chamber 50 and thence to a peripheral chamber 52 defined by a recess in valve body 8 and cylindrical spout body 54 which surrounds and rotates about the valve body 8. Chamber 52 is interconnected to spout passage 56 formed in discharge spout 58 which is integral with cylindrical spout body 54.

The entire faucet 6 may be attached to mounting structure 60 such as an apertured sink top via nut 62 that engages a threaded sleeve that projects downwardly from the base 9.

All of the structure heretobefore described is well known in the art as exemplified by U. S. Pat. No. 3,056,418. The instant invention relates to the construction of the composite valve member 26 and its relationship to surrounding structure, particularly pin 44.

Valve member 26 is a composite member molded of synthetic plastic as a pair of mating valve parts 64 and 66, both having a generally hemispherical outer profile as best may be seen in FIG. 4 of the drawing. Upper member 64 is formed with four downwardly protruding, equally spaced pins 68 (only two shown) and a downwardly protruding central post 70. Pins 68 and post 70 are received in frictional fits in mating cavities formed in lower valve member 56 such that the two members 64 and 66 can be snapped together to form the composite valve member 26.

Recess 46 of composite valve member 26 comprises a recess 46a in member 64 and a recess 46b in member 66. In order to prevent unacceptable wear of the plastic material of valve member 26 due to the continual sliding contact with pin 44, a metal, wear preventing insert 72 is mounted in recess 46. Insert 72 comprises a main body 74 having an aperture 76 therethrough through which pin 44 is positioned. A pair of ears 78 and 80 extend laterally from insert main body 74.

As best may be seen in FIG. 5 of the drawing, valve member part 66 has formed therein grooves 82 and 84 adjacent recess portion 46b. Similar grooves are formed in valve portion 64 adjacent recess portion 46a. At the time of assembly of valve member parts 64 and 66, insert 72 is slidably mounted into one of these parts by insertion of ears 78 and 80 into the grooves of one of the valve member parts. As the valve member parts are snapped together, the insert ears are received in the grooves of the other of these parts, thus locking the insert into the composite valve member 26.

It thus may be seen from the foregoing that there is provided a valve faucet having an arcuate valve member that easily may be molded in two, easily assembled pieces from plastic material to obtain a composite element having the desired shape to accomplish valving function in the faucet of the type disclosed. This composite valve member is simple and easy to manufacture and assemble. Unacceptable wear of the plastic material due to contact with valve member movement limiting stop means is prevented by the provision of a metal insert having much greater hardness and resistance to wear than the plastic material of the valve body.

I claim:

1. A water faucet including a valve body having an inlet duct connectable to a source of water and an outlet duct, valve means within said body selectively movable to interconnect said inlet and outlet ducts and to isolate said inlet and outlet ducts, a manually operable handle extending from said body and connected to said valve means for movement of said valve means, stationary stop means connected to said valve body and limiting the range of movement of said valve means, the improvement comprising: said valve means being an arcuate valve member formed from plastic material and having a recess formed therein, said stop means protruding from said valve body and being received in said recess, and an insert member having an aperture therethrough mounted in said recess, said stop means extending through said aperture and into said recess, said insert being formed from a material having greater resistance to wear than said plastic material.

2. The faucet of claim 1, wherein said valve member has a sperical outer shape and consists of two interlocking parts that meet at mating surface formed on each part.

3. The faucet of claim 2, wherein each of said parts is formed with a groove therein extending from each of said mating surfaces, said insert being mounted by said valve member by being partially received in each groove of each of said parts.

4. A single handle hot and cold water mixing and flow control faucet including a valve body connectable to a source of cold water and a source of hot water, said valve body having an outlet duct formed therein, valve means within said valve body selectively movable among preselected positions to interconnect said sources and said duct such that varying volumes and proportions of cold and hot water are directed to said duct and to isolate said sources from said duct, a manually operable handle extending from said valve body and connected to said valve means for movement of said valve means, stop means connected to said body and capable of bearing on said valve means to limit movement of said valve means to among said preselected positions, the improvement comprising: said valve means being formed from a first material and with a recess in the outer surface thereof, the periphery of said recess being lined by a second material of greater resistance to wear than said first material, said stop means extending from said valve body and being partially received in said recess, said valve member comprising a pair of molded plastic parts, one of said parts having a plurality of male interconnecting elements formed thereon and the other of said parts having complementary female cavities formed therein receiving said male elements and thereby providing interconnection of said parts, said recess being formed partially in each of said parts, and a metal insert having an aperture formed therethrough being positioned in said recess to line said recess, said stop means extending through said aperture such that contact between said stop means and said plastic parts is prevented.

5. The faucet of claim 4, wherein each of said plastic parts has a pair of grooves formed therein adjacent a portion of said recess, said insert comprising a main body through which said aperture is formed and a pair of ears extending from said main body, said ears being received in said grooves to mount said insert to said plastic parts within said recess.

* * * * *